United States Patent [19]
Lyons et al.

[11] Patent Number: 5,969,451
[45] Date of Patent: Oct. 19, 1999

[54] CURRENT-CONTROLLED MAGNETIC THRUST COMPENSATORS FOR MECHANICAL THRUST BEARINGS

[75] Inventors: James Patrick Lyons; Mark Alan Preston, both of Niskayuna, N.Y.; Eike Richter; Albert Frank Storace, both of Cincinnati, Ohio

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/764,186

[22] Filed: Dec. 13, 1996

[51] Int. Cl.⁶ .................................................. H02K 7/09
[52] U.S. Cl. ........................................... 310/90.5; 310/90
[58] Field of Search ...................................... 310/90.5, 90

[56] References Cited

U.S. PATENT DOCUMENTS

| | | | |
|---|---|---|---|
| 3,731,984 | 5/1973 | Habermann | 308/10 |
| 3,779,618 | 12/1973 | Soglia et al. | 308/10 |
| 4,338,533 | 7/1982 | Grafenschnell | 310/154 |
| 4,920,291 | 4/1990 | McSparran | 310/90.5 |
| 5,003,211 | 3/1991 | Groom | 310/90.5 |
| 5,300,841 | 4/1994 | Preston et al. | 310/90.5 |
| 5,300,842 | 4/1994 | Lyons et al. | 310/90.5 |
| 5,300,843 | 4/1994 | Lyons et al. | 310/90.5 |
| 5,543,673 | 8/1996 | Katsumata et al. | 310/90.5 |
| 5,565,722 | 10/1996 | Rubner et al. | 310/90.5 |
| 5,578,880 | 11/1996 | Lyons et al. | 310/90.5 |
| 5,627,421 | 5/1997 | Miller et al. | 310/90.5 |
| 5,749,700 | 5/1998 | Henry et al. | 415/104 |

FOREIGN PATENT DOCUMENTS

| | | | |
|---|---|---|---|
| 411697 | 2/1991 | European Pat. Off. | 310/90.5 |
| 57-154517 | 9/1982 | Japan | 310/90.5 |
| 58-65321 | 4/1983 | Japan | 310/90.5 |

OTHER PUBLICATIONS

U. S. Patent Application Entitled "Magnetic Axial Thrust Bearings Fabricated On Individual Stator Segments" By GB Kliman, et al, Ser. No. 08/493,022 (ATTY Docket RD–23,282) Filed Jun. 21, 1995.

U. S. Patent Application Entitled "Fault Tolerant Magnetic Thrust Bearing With Segmented Stator" By MA Preston, et al, Ser. No. 08/567,500 (ATTY Docket RD–24,769FW) Filed Dec. 5, 1995.

U. S. Patent Application Entitled "Fault Tolerant Magnetic Thrust Bearing With Segmented Stator" By MA Preston, et al, Ser. No. 08/276,585 (ATTY Docket RD–22,703) Filed Jul. 18, 1994.

*Primary Examiner*—Nestor Ramirez
*Assistant Examiner*—Karl Ie Tamai
*Attorney, Agent, or Firm*—Ann M. Agosti; Jill M. Breedlove

[57] ABSTRACT

A magnetic thrust compensator for a mechanical thrust bearing includes a parallel operating axial magnetic bearing including a stator including two parallel stator extensions, a rotor disk situated between the two stator extensions, and first and second electromagnets each situated on a respective stator extension and facing the rotor disk. A controller selectively energizes one of the electromagnets. Additional stator extensions and rotor disks can be used to provide fault tolerance. The electromagnets can each include dual annular windings. The compensator can include an additional stator extension, an additional rotor disk, and bias magnet situated on the additional stator extension and facing the additional rotor disk with the controller being adapted to selectively supply current to the bias magnet. In a closed loop embodiment, the mechanical thrust bearing can be spring mounted and, to determine the appropriate energization level of one of the electromagnets, the controller can determine a magnetic air gap length between the rotor disk and one of the stator extensions.

14 Claims, 8 Drawing Sheets

5,969,451

CURRENT-CONTROLLED MAGNETIC THRUST COMPENSATORS FOR MECHANICAL THRUST BEARINGS

BACKGROUND OF THE INVENTION

High power turbo-machinery can generate substantial load requirements for axial thrust bearings. These load requirements are especially high in fanless stationary aero-derivative engines and in gas turbine engines which typically use compressor bleed gas to push against a thrust piston and thus offload a mechanical rolling element thrust bearing. The compressor bleed gas approach is subject to large variations in leakage which cannot be actively controlled and produce a substantial reduction in operating efficiency. Gas turbine engines can generate bi-directional thrust with a large maximum aft thrust force generated during steady state operation and a smaller forward transient thrust force generated during shutdown. The maximum aft thrust force generated by a gas-turbine can exceed the transient load capability of a mechanical thrust bearing.

SUMMARY OF THE INVENTION

It would be desirable to have a controlled electromagnetic force for reducing the load on a mechanical thrust bearing in order to minimize the bearing size and extend its operating life while consuming minimal power and thus increasing the operating efficiency of the machine. The present invention is particularly useful for stationary aero-derivative engines, as well as gas turbines, steam turbines, and hydrogenerators, for example.

In the present invention a magnetic thrust compensator is fabricated using an axial magnetic bearing comprising a plurality of parallel magnetic stator extensions, a shaft supporting a plurality of magnetic bearing rotor disks, and a plurality of electromagnets. Each one of the plurality of electromagnets is situated on a respective one of the plurality of stator extensions and facing a respective one of the plurality of rotor disks. A controller controls current in the electromagnets to produce a desired force. If desired, an additional stator extension including a bias magnet can be situated to face a respective one of the rotor disks.

In one embodiment, an open loop analysis is used wherein a model of air flow variables such as temperature can be used to predict a requisite electromagnet force.

In another embodiment a closed loop analysis is used to magnetically control and limit the axial load on a conventional mechanical thrust bearing by using a parallel operating bi-directional magnetic thrust bearing and a compliant spring mount for the mechanical bearing. This embodiment is more convenient than performing the substantial engine redesign which would be necessary to create a magnetic replacement for the mechanical thrust bearing. The inductance characteristic of one electromagnet of the bi-directional axial magnetic bearing (or other position sensing means such as an eddy current sensor for gap lengths) can be used to infer mechanical bearing force while a second electromagnet can generate the requisite electromagnetic force to maintain a desired thrust load on the mechanical bearing. The physical structure of the magnetic bearing can include an integral auxiliary or backup mechanical bearing for safely stopping the machine in the event of an overload or component failure. The magnetic thrust compensator can be made fault-tolerant so that it will continue functioning in the presence of one or more component failures.

In either of the open or the closed loop embodiments, a bias magnet may comprise either a uni-directional permanent magnet or a uni-directional electromagnetic bias magnet. A uni-directional permanent magnet can supply a uni-directional force sufficient to insure that the transient load rating on the mechanical bearing is not exceeded in the event of a control failure. The thrust compensator thus maintains a moderate constant unidirectional axial force on the mechanical thrust bearing to prevent skidding while not creating excessive steady state bearing forces. If desired, the permanent magnet can be fabricated with a magnetization winding capable of either magnetizing or demagnetizing the permanent magnet. A uni-directional electromagnetic bias magnet can be slightly less reliable than the permanent magnet, but the electromagnetic bias magnet is less expensive and permits significant simplification in construction and maintenance of the magnetic bearing system.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
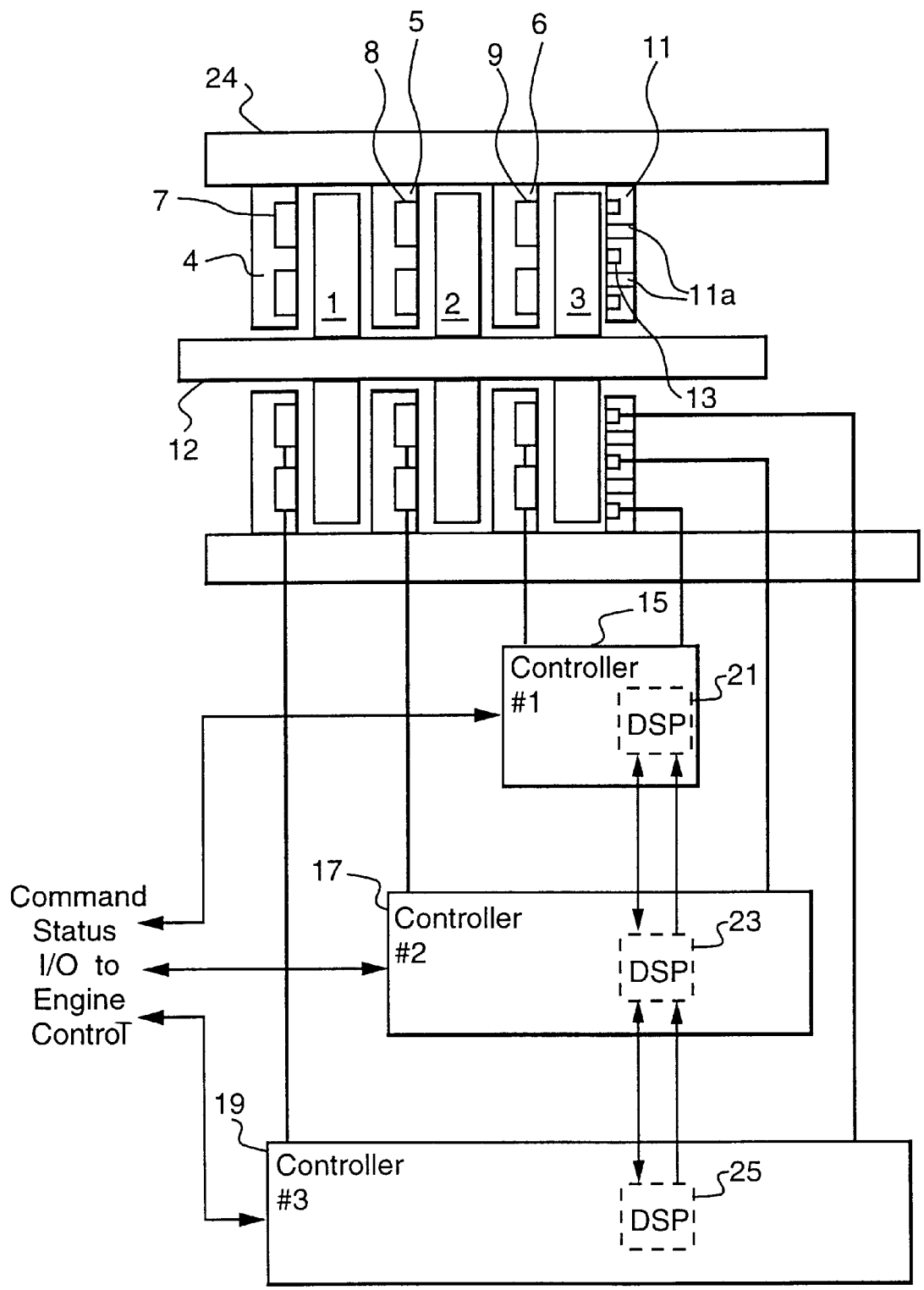
FIG. 1 is a side view of one embodiment of a magnetic thrust compensator system of the present invention.
Figure 2:
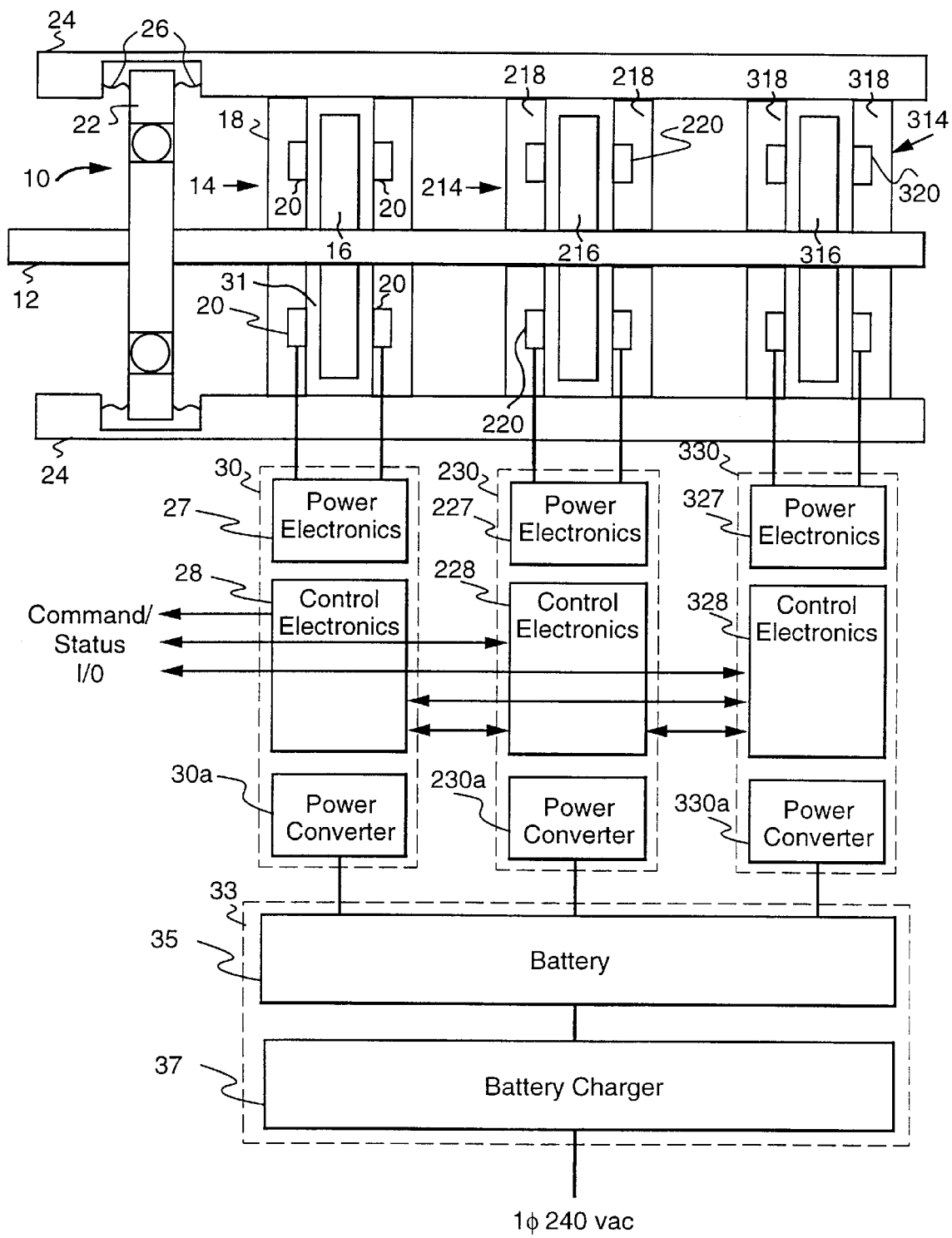
FIG. 2 is a side view of another embodiment of a magnetic thrust compensator system of the present invention. system.

FIG. 1 is a side view of one embodiment of a magnetic thrust compensator system of the present invention mounted on a machine shaft 12 (in close proximity to a mechanical thrust bearing 10—shown in FIG. 2) and including axial magnetic bearing rotor disks 1, 2, and 3, axial magnetic bearing stator extensions 4, 5, and 6 from a stator frame 24, and axial magnetic bearing dual annular electromagnetic windings 7, 8, and 9.

The rotor disks can be made of a high strength non-laminated magnetic material (such as American Iron and Steel Institute (AISI) 4340) and be welded onto a non-magnet sleeve (not shown) which is fitted onto the engine shaft 12. Each of the dual annular electromagnetic windings can be embedded into a stator annular E core electromagnet structure comprising a material such as silicon-iron, for example.

Because each of the three axial magnetic bearings has its own magnetic stator extension and rotor disk, failures in one will not effect the remaining two axial magnetic bearings.

Therefore, the thrust bearing is capable of maintaining axial force control with two of the three available individual bearings functioning.

An additional stator extension 11 can be configured so as to attract one of the rotor disks in an opposing direction from the other two of the rotor disks. Stator extension 11 can be fabricated, for example, with three smaller embedded electromagnet windings 13 with each of these windings being separated by a non-magnetic flux barrier 11a which may comprise INCONEL™ (a trademark of Inco Alloys International for a metal alloy including 75 nickel, 15 Chromium, and 9% iron) and serves to minimize the magnetic coupling between adjacent windings and thus permits non-faulted force-producing stator electromagnets to continue functioning in the proximity of faulted electromagnets.

The individual bearings are grouped into three control axes with each axis controlled by a computer based controller 19, 17, or 15, respectively, which utilizes power electronic switching devices and a respective digital signal processor 25, 23, or 21, respectively, to control the current in the windings in order to produce the desired force.

If a feedback loop (closed loop control) is desired, each of the controllers can be equipped with a proximity probe (not shown) so that each controller can measure the relative displacement of a rotor disk to the respective stator extension (i.e., an air gap length). Alternatively, because of the mutually exclusive excitation of the two windings per controller for force production, each of the controllers can apply high frequency probing pulses to the unused winding for purposes of sensing the air gap length.

In another controller arrangement, the controllers are partitioned into actuation and supervisory sections (not shown). The supervisory digital signal processors are configured in a dual redundant configuration so that either controller is capable of commanding power electronic switching.

FIG. 2 is a side view of a magnetic compensator system of the present invention for a mechanical thrust bearing 10. The mechanical thrust bearing is mounted on machine shaft 12 in close proximity to an axial magnetic bearing 14 including an axial magnetic bearing rotor disk 16, an axial magnetic bearing stator extension 18, and axial magnetic bearing annular windings 20. Axial magnetic bearings 214 and 314 (including axial magnetic bearing rotor disks 216 and 316, axial magnetic bearing stator extensions 218 and 318, and axial magnetic bearing annular windings 220 and 320) are optional bearings for fault-tolerant applications, as discussed below.

In a closed loop embodiment, an outer race 22 of mechanical thrust bearing 10 can be attached to stator frame 24 by a bi-directional spring 26 having a controlled compliance. A direct relationship is thus present between the axial force load on the mechanical thrust bearing and the relative axial position between the magnetic bearing stator extension and rotor disk.

Axial magnetic bearing rotor disk 16 comprises a passive rotor disk which is magnetically attracted by either of two axial magnetic bearing annular windings 20 (hereinafter referred to stator electromagnets 20). One of the two stator electromagnets will be energized by power electronics 27 controlled by control electronics 28 in a thrust compensator control system 30 to attract the rotor disk according to the sign of the desired axial force with the magnitude of stator current being controlled to establish the attractive force amplitude. The non-energized stator electromagnet is available for high frequency probing. Probing pulses can be applied to the non-energized electromagnet to measure the stator electromagnet inductance which is a function of an air gap 31 length between the rotor disk and the stator extension. Power can be supplied to a power converter 30a by a power supply 33 which can include a battery 35 and a battery charger 37. If desired, conventional air gap estimation techniques, such as the use of eddy current sensors can be used instead of the probing pulses.

As discussed above, in an open loop embodiment, models of air flow are used to predict the needed flux. The mechanical thrust bearing can be mounted in such a manner as to prevent any significant axial rotor disk motion. In this embodiment, the thrust compensator would be unable to actually regulate or control force on the mechanical bearing. The thrust compensator would be commanded by the engine control unit to create a specific force with a level computed by the engine control unit base on an engine thrust model algorithm. The magnetic thrust compensator would create the bulk of the axial force required and thereby limit the mechanical thrust bearing force to safe levels. The open loop thrust compensation system would be limited by the accuracy of the feed-forward engine thrust and magnetic force models, so a constant uni-directional mechanical bearing force could not be guaranteed.

The surface of the magnetic bearing rotor disk 16 and stator extension 18 of FIG. 2 can also function as a mechanical bumper bearing to prevent overload of the mechanical bearing in the event of a magnetic compensator failure by keeping the nominal air gap length 31 less than the maximum spring deflection. To facilitate the transient physical contact, the bearing stator extension/rotor disk surface can be self-lubricating by proper selection of wear surfaces or by impregnation with a lubricating agent. Alternatively, the stator extension and rotor disk surfaces can be lubricated by a more conventional technique such as an oil mist system.

A fault-tolerant magnetic thrust compensator can be made by including three identical parallel acting electromagnetic structures, including redundant electromagnets 20, 220, and 320, compensator control systems 30, 230, and 330, power electronics 27, 227, and 327, control electronics 28, 228, and 328, and power converters 30a, 230a, and 330a, as shown in FIG. 2. In one embodiment, each of the three electromagnet structures can produce fifty percent of the required axial force, so the system thus requires only two of the three available electromagnetic structures to effectively function.

Figure 3:
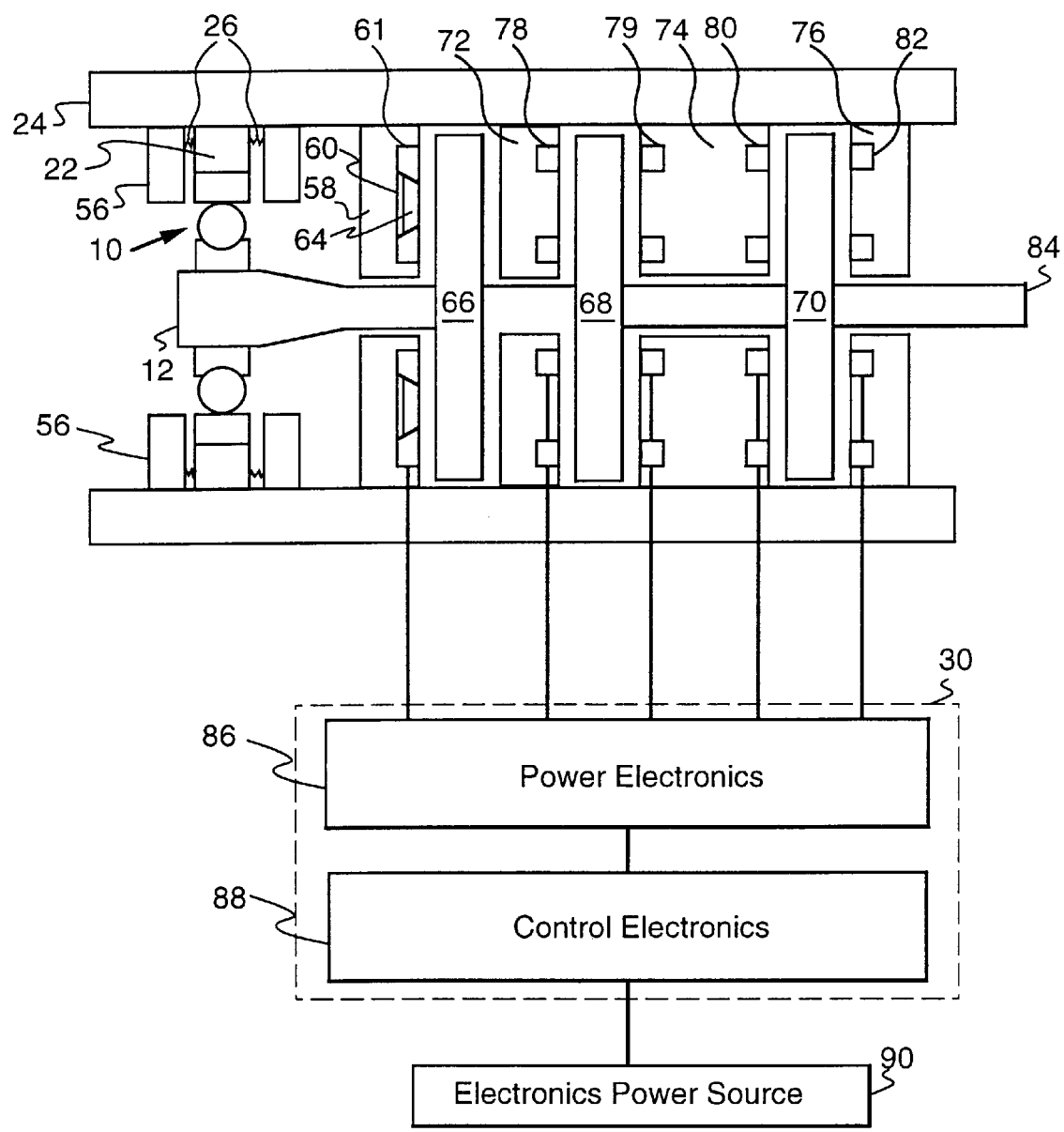
FIG. 3 is a side view of an embodiment of a magnetic thrust compensator system similar to that of FIG. 2 with the addition of a permanent magnet.

FIG. 3 is a side view of an embodiment of a magnetic thrust compensator system similar to that of FIG. 2 with the addition of a bias magnet shown as an annular permanent magnet 60. The permanent magnet of the axial magnetic bearing generates a fixed forward bias force while the controllable electromagnets 78, 79, 80, and 82 of the axial magnetic bearings can generate a net force in either forward or aft directions. An electronic power source 90 supplies power to the control electronics 88 and power electronics 86 of compensator control system 30.

Axial disk deflection is constrained by mechanical stops 56. The axial spring constant of compliance spring 26 is selected such that the desired load for the mechanical bearing is achieved half way between the mechanical stops.

Rotor disk 66 on shaft 84 is attracted by the annular ring of permanent magnet material 60 (such as samarium cobalt) suitable for the required operating temperature range of the machine. The permanent magnet material is positioned in a magnetic annular stator extension 58 and covered with a tapered magnetic cap 64 which concentrates the magnet flux at the air gap to maximize the attractive force. The annular stator extension comprises a non-laminated magnetic material such as silicon-iron or cobalt-iron.

The permanent magnet material is encapsulated by non-magnetic wedge shaped rings 61 so that the brittle permanent magnet material is supported after magnet assembly. The permanent magnet is sized to generate a forward force on the shaft which is sufficient to ensure that the maximum transient load rating of the mechanical thrust bearing will not be exceeded in the event that the parallel operating electromagnets 78, 79, 80, and 82, which operate as discussed above with respect to FIG. 2, are not functioning.

Although two rotor disks 68 and 70 are shown with the electromagnets, the number of disks will depend upon the maximum forces and the degree of fault-tolerance desired. Preferably at least two rotor disks 68 and 70 are used, although one rotor disk may be sufficient in certain applications. When two such rotor disks are used, a total of at least four stator extensions 58, 72, 74, and 82 are present. As shown by stator segment 74, if desired, a single stator segment can support electromagnets for two rotor disks located on opposite sides of that stator segment.

In the embodiment shown in FIG. 3, for illustrative purposes each of the electromagnets 78, 79, 80, and 82 is a dual annular winding. A single annular winding, as shown in FIG. 2, can also be employed. Likewise, the dual annular windings of FIGS. 1 and 3 can also be used in the embodiment of FIG. 2.

FIGS. 4a–4e are side views of a magnetic thrust compensator system under a variety of load conditions. The descriptions of FIGS. 4a–4e are generally applicable to the operations of each of FIGS. 3, 5, and 7. Therefore, a bias magnet extension 59 is used without explicitly showing the permanent magnet in the manner that the permanent magnet is shown in FIG. 3.

Figure 4A:
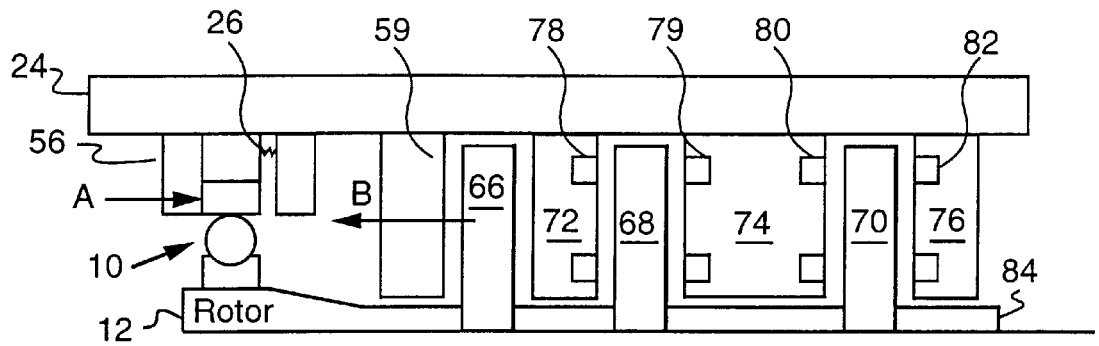
FIGS. 4a–4e are side views of a magnetic thrust compensator system under a variety of load conditions.

FIG. 4a illustrates the compensator system at initial power up in the home or parked position. The strength of the permanent magnet will force the mechanical disk spring against the forward stop 56 with the full magnet force in the B direction, which is opposite the force in the A direction on the mechanical bearing. Because the permanent magnet forces the system to a known fixed position, the control electronics can verify the correctness of the air gap calculations from all four available electromagnets 78, 79, 80, and 82.

Figure 4B:
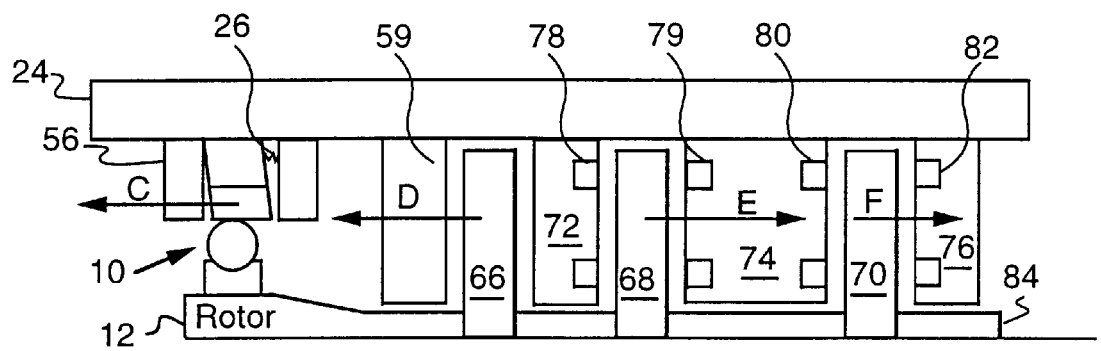

FIG. 4b illustrates the compensator system in the engine start position under conditions wherein the two electromagnetic axial bearings produce forces in a direction represented by arrows E and F opposite to that of the forces C and D on the mechanical bearing and rotor disk 66 adjacent the permanent magnet, respectively. The mechanical thrust bearing therefore deflects in the aft direction.

The control electronics (shown as control electronics 88 in FIG. 3) can measure and verify the stiffness of the compliant disk structure and the permanent magnet strength using an electromagnetic model of a controlled axial bearing which computes both force and air gap length between a stator extension and a rotor disk from the magnet terminal quantities of voltage and current. Once the magnetic thrust compensation is active it will attempt to maintain the mechanical thrust bearing at this position irrespective of engine thrust conditions and thereby achieve the desired moderate bearing load.

Figure 4C:
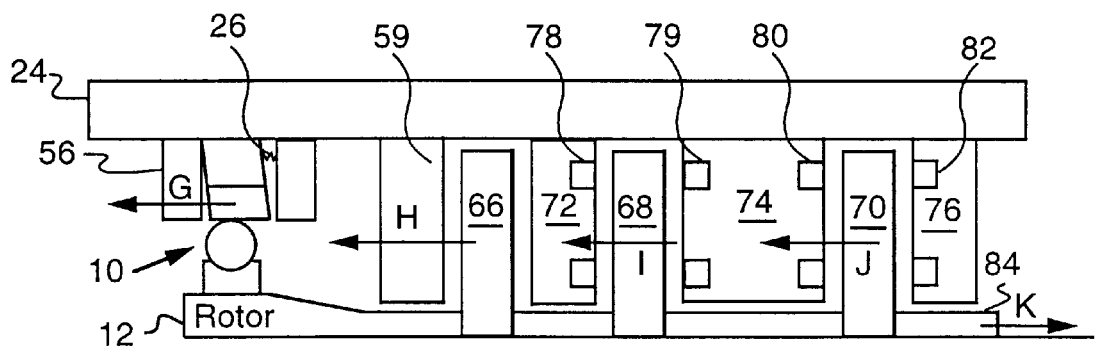

FIG. 4c illustrates compensator system operation with maximum aft engine thrust in the direction represented by arrow K. In order to maintain the desired thrust bearing axial position, the controller will generate a forward force in each of the two electromagnetic axial bearings in a direction represented by arrows I and J in the same direction as the forces G and H on the mechanical bearing and rotor disk 66. During steady state operation the controller will continually check the veracity of its inferred axial position feedback and the continued operation of compliant disk structure by perturbing the desired axial position of the mechanical thrust bearing. The cyclic perturbation will allow the controller to compute an effective stiffness for the spring mount, thus continuously self-checking the operation of the compensator system.

Figure 4D:
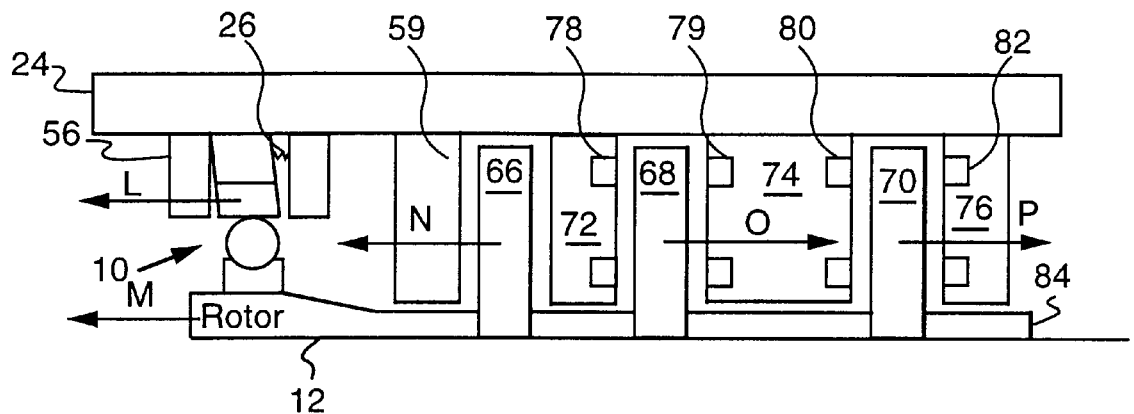

FIG. 4d illustrates compensator system operation with maximum forward engine thrust in the M direction requiring each to of the controlled axial bearings to transiently create an aft force represented by arrows O and P in the opposite direction from the forward forces on the mechanical thrust bearing and rotor disk 66 represented by arrows L and N, respectively.

Figure 4E:
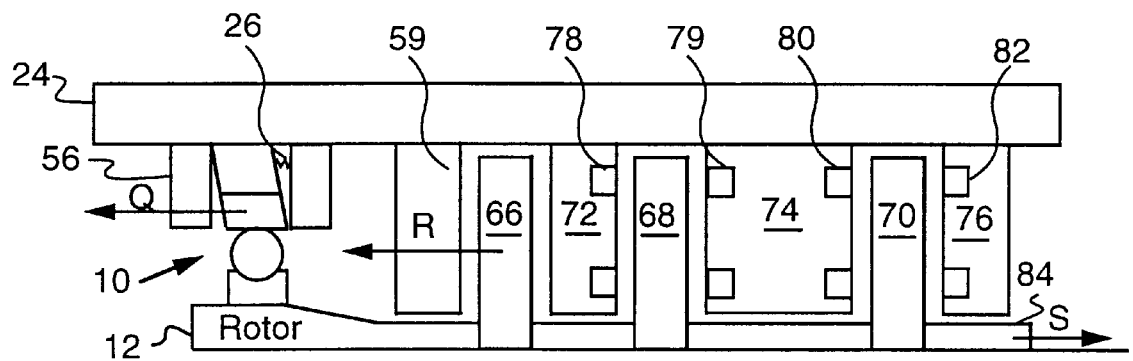

FIG. 4e illustrates the compensator system in the event of a total failure of the controlled electromagnets with the engine generating a maximum aft thrust represented by arrow S in an opposite direction from the force of the mechanical thrust bearing (represented by arrow Q). The axial deflection of mechanical thrust bearing is limited by the aft stop 56 at maximum deflection producing force in the compliant disk structure represented by arrow R.

Figure 5:
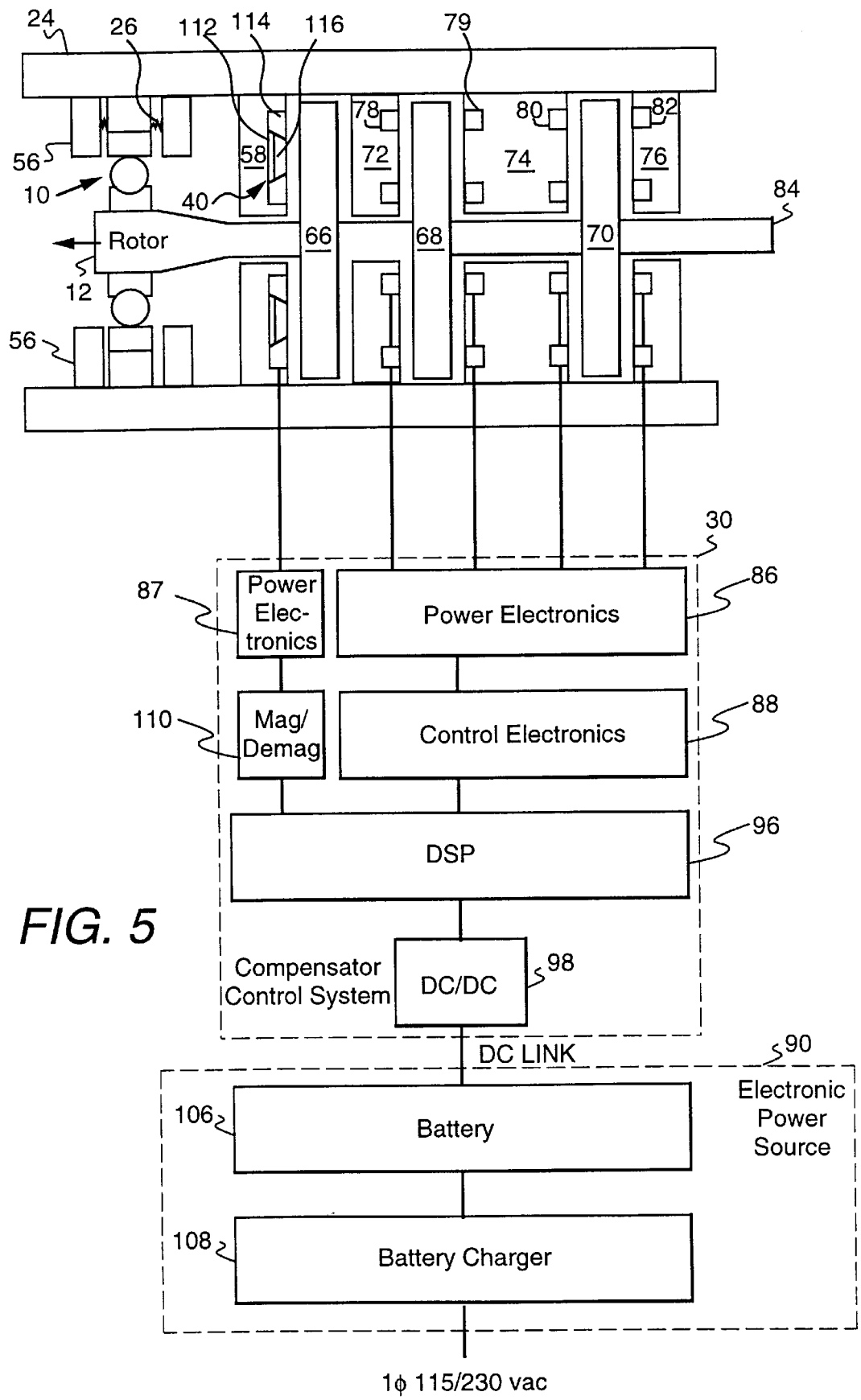
FIG. 5 is a side view of an embodiment of a magnetic thrust compensator system similar to that of FIG. 3 with the addition of an excitation winding around the permanent magnet.

FIG. 5 is a side view of an embodiment of a magnetic thrust compensator system similar to that of FIG. 3 with of a permanent magnet 112 having a winding 114 capable of magnetizing and demagnetizing the permanent magnet.

The permanent magnet material 112 comprises material suitable for the operating temperature range. In one embodiment aluminum-nickel-cobalt permanent magnet material is used for a temperature range of up to and including 200° C. The permanent magnet material is placed in a magnetic stator extension and covered with a tapered magnetic cap 116 which concentrates the magnetic flux at the air gap to maximize the attractive force. The stator extension 58 comprises a non-laminated magnetic material such as silicon-iron or cobalt-iron.

The structure of the permanent magnet of FIG. 5 differs from that of FIG. 3 in that the annular ring of permanent magnet material is encircled by excitation winding 114 which is capable of generating sufficient ampere-turns to either magnetize or demagnetize the permanent magnet material. In order to completely demagnetize the material, a controlled ac current of diminishing amplitude must be created in the excitation winding which will create a B-H magnetization curve trajectory required to demagnetize the material.

The compensator control system 30 of FIG. 5 can be similar to those discussed with respect to FIGS. 2 and 3 with power electronics 86, control electronics 88, a digital signal processor (DSP) 96, and a DC/DC power converter 98 and with the addition of a magnetization/demagnetization control block 110 providing instructions to power electronics 87 for the permanent magnet 112 and the excitation winding 114.

The views and discussion of FIGS. 4a–4e are similar for the permanent magnet having an excitation winding.

Figure 6:
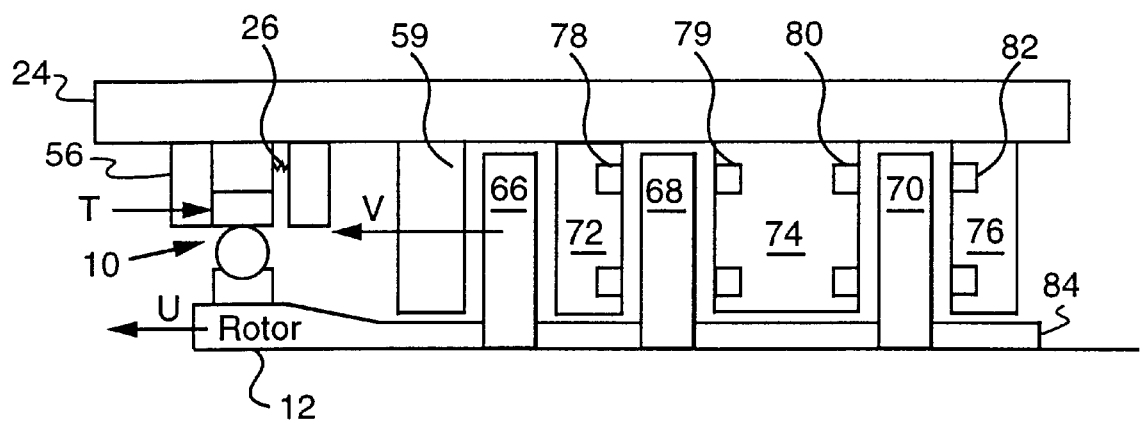
FIG. 6 is a side view of a magnetic thrust compensator system under a maximum forward thrust load condition.

FIG. 6 illustrates the compensator of FIG. 5 in the event of a total failure of the controlled electromagnets with the engine generating a maximum forward thrust represented by arrow U. Forward thrust is produced by the engine when the fuel is rapidly shut off as in an emergency shutdown. To prevent transient overload of the mechanical thrust bearing under such conditions, the engine control unit will instigate a turnoff of the permanent magnet causing the current (and the forces in the directions of arrows T and V) to decay. The engine control unit can cause a partial demagnetization of the permanent magnet by triggering a fixed width voltage pulse forcing along the B–H magnetization curve trajectory to provide an irreversible magnetization loss and reduction of the force capacity of the permanent magnet.

Figure 7:
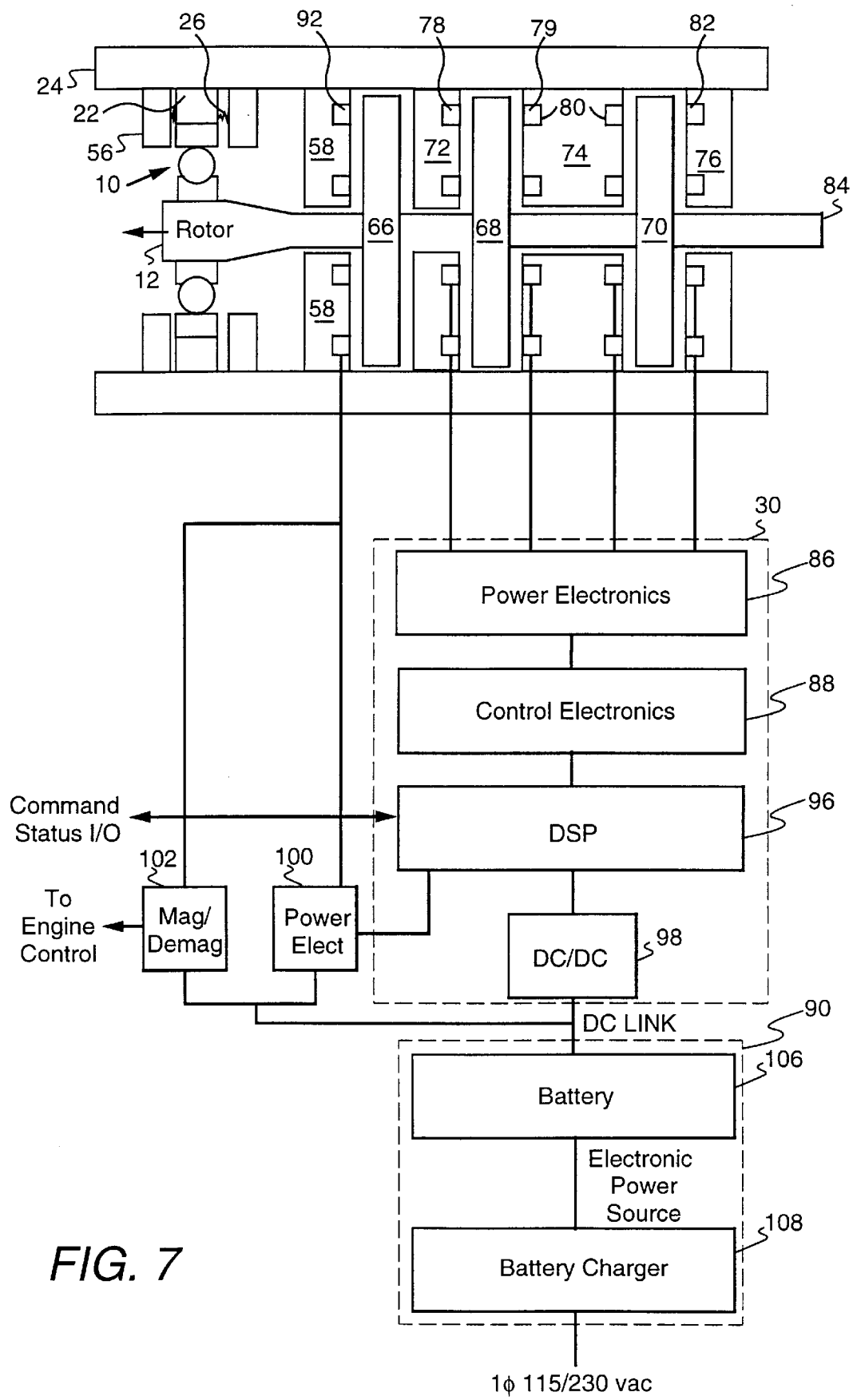
FIG. 7 is a side view of an embodiment of a magnetic thrust compensator system similar to that of FIG. 2 with the addition of an electromagnetic bias magnet.

FIG. 7 is a side view of an embodiment of a magnetic thrust compensator system similar to that of FIG. 2 with the addition of a bias annular electromagnet winding 92 (hereinafter referred to as an electromagnetic bias magnet). The thrust compensator thus has both an electromagnetic bias magnet which generates a fixed forward bias force while the controllable electromagnets 78, 79, 80, and 82 of the axial magnetic bearings can generate a net force in either forward or aft directions. As discussed above with respect to the permanent magnet, although preferably at least two rotors 68 and 70 are controlled on both sides by controllable electromagnets 78, 79, 80, and 82, one such rotor can be sufficient in certain applications.

The electromagnetic bias magnet is sized to generate a fixed secure forward force on the shaft 84 which is sufficient to insure that the maximum transient load rating of the mechanical thrust bearing 10 will not be exceeded in the event that the parallel operating controlled electromagnets are not functioning. The electromagnetic bias magnet may comprise a simple, uncontrolled electromagnet fed either from a constant, reliable voltage source which may be an independent battery system (not shown) or from a battery system (shown as a power supply 90) also supplying power to the controlled annular electromagnet windings. Because uncontrolled electromagnetic bias magnets are quite reliable, they are not subject to the common failure modes of controlled electromagnets such as shorted power electronic switches and control computer failures. The magnetic thrust compensator DSP controller 96 can monitor current flow into the electromagnetic bias magnet and thus readily detect the different possible winding failures (i.e. ground fault, shorted turns, open connector, etc.) and initiates a controlled shutdown in the event of a electromagnetic bias magnet failure.

The electromagnetic bias magnet is energized via two parallel acting solid state relays 100 and 102, one commanded from the magnetic thrust compensator control system 30 and the second commanded from the engine controller (not shown). To de-energize the electromagnetic bias magnet after the engine is shut down, both controllers must act together.

If the compensator control system 30 is fed from a power supply 90 which comprises a battery system, the entire biased magnetic thrust compensator can continue operating through transient ac power outages without losing axial force control. If ac power outages are unlikely, the battery backup can be limited to the electromagnetic bias magnet and still provide a safe shutdown in the unlikely event of an ac power outage. If a dual battery system is used, the most cost efficient battery technology is sealed maintenance-free lead-acid type batteries which are widely used for computer and telephone backup power systems. Because such batteries have both sudden failure mechanisms and inherent wear mechanisms, reliability is increased by using a dual battery charger system. Nickel cadmium batteries are inherently more reliable, lack the wear mechanisms of lead-acid batteries, and can be used where one common battery 106 and charger 108 feeds both the electromagnetic bias magnet and the controlled electromagnets, as shown in FIG. 7.

Nickel cadmium batteries are more expensive than lead-acid batteries and require periodic electrolyte maintenance. Various permutations of redundant batteries and chargers are possible, and the preferred design will depend on overall system reliability requirements.

As described with respect to FIG. 3, axial disk deflection is constrained by mechanical stops 56. The axial spring constant of compliance spring 26 is selected such that the large load for the mechanical bearing is achieved half way between the mechanical stops.

Rotor disk 66 is attracted by an annular "E" core stator extension 58 of magnet material such as silicon-iron or cobalt-iron suitable for the required operating temperature range of the machine. The electromagnetic bias magnet is sized for specific distributed resistance so that, when excited by a constant voltage source, a desired nominal winding current is achieved. This winding current excitation level is thus subject to variability due to temperature dependent winding resistance changes and voltage source variations which create changes in the axial force produced by the electromagnetic bias magnet. The attractive force produced by the electromagnetic bias magnet is also affected by air gap variations with axial rotor disk motion which result from leakage flux increases at larger air gaps and the consequent reduction of rotor flux density. These force variations can be minimized by "overexciting" the electromagnetic bias magnet with sufficient ampere-turns to drive the magnetic flux path deep into saturation. For example, with silicon-iron stator material ultimately limited to a 2.0 T flux density, the controlled electromagnets would typically be designed to produce rated force at a 1.8 T flux density, while the electromagnetic bias magnet is driven to 1.95 T. The increased flux density results in 17.3% more force produced by the electromagnetic bias magnet as compared to equivalently sized controlled electromagnets with some reduction in efficiency due to relatively higher $i^2R$ losses but less eddy current losses.

The views and discussion of FIGS. 4a–4e and FIG. 6 are similar for the electromagnetic bias magnet. With respect to FIG. 6, a turnoff will cause the bias current to exponential decay at its inherent L/R indicative time constant. Because force is roughly proportional to $i^2$, the force will decay at a faster rate.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A bearing system comprising:
   (a) a mechanical thrust bearing including
      a rotor shaft,
      a bearing disk supported by the rotor shaft,
      an outer race mechanically coupled to the bearing disk,
      a stator,
         first and second mechanical stops attached to the stator and situated on opposite sides of the outer race, and
         a compliant spring mount coupled to the outer race and including first and second springs respectively coupled between the outer race and the first and second mechanical stops, each of the first and second springs having an axial spring constant selected to position a desired load for the mechanical thrust bearing about halfway between the two mechanical stops; and (b) a magnetic thrust compensator for the mechanical thrust bearing, the magnetic thrust compensator including at least two parallel stator extensions, a rotor disk situated on the rotor shaft between the at least two stator extensions, wherein a maximum distance between the rotor disk and one of the at least two stator extensions is less than a maximum deflection distance of the spring, first and second electromagnets, each electromagnet situated on a respective one of the at least two stator extensions and facing the rotor disk, and a controller for selectively energizing one of the first and second electromagnets to reduce an undesired axial load on the mechanical thrust bearing.

2. The compensator of claim 1, wherein the stator includes at least four stator extensions, and further including;

two additional rotor disks, each additional rotor disk being situated between two respective ones of the at least four stator extensions, and two additional pairs of first and second electromagnets, each electromagnet of a respective additional pair being situated on a respective one of the at least four stator extensions and facing a respective one of the two additional rotor disks, wherein the controller is adapted to control current in the two additional pairs of first and second electromagnets.

3. The compensator of claim 1, wherein each electromagnet comprises a dual annular winding.

4. The compensator of claim 1, wherein the controller is further adapted to estimate the distance of an air gap between the rotor disk and one of the at least two stator extensions.

5. The compensator of claim 1, further including:

an additional stator extension, the additional stator extension being situated parallel to the at least two stator extensions;

an additional rotor disk; and a bias magnet situated on the additional stator extension and facing the additional rotor disk for receiving a current selectively controlled by the controller, wherein the controller is adapted to selectively supply current to the bias magnet.

6. The compensator of claim 5, further including:

a second additional stator extension;

a second additional rotor disk, the second additional rotor disk being situated between one of the at least two stator extensions and the second additional stator extension, and first and second additional electromagnets, each additional electromagnet facing the second additional rotor disk, wherein the controller is adapted to control current in the first and second additional electromagnets.

7. The compensator of claim 5, wherein the bias magnet comprises a permanent magnet.

8. The compensator of claim 7, further including a magnetic cap covering the permanent magnet and nonmagnetic wedge shaped rings for supporting the permanent magnet in the additional stator extension.

9. The compensator of claim 7, wherein the controller is further adapted to verify a permanent magnet strength of the mechanical thrust bearing by estimating magnetic force using voltage and current measurements of the first and second electromagnets.

10. The compensator of claim 7, further including an excitation winding around the permanent magnet, the excitation winding being capable of magnetizing and demagnetizing the permanent magnet.

11. The compensator of claim 10, wherein the controller is adapted to partially demagnetize the permanent magnet by selectively supplying current to the excitation winding.

12. The compensator of claim 5, wherein the bias magnet comprises an electromagnetic bias magnet.

13. The compensator of claim 12, wherein the bias magnet comprises a dual annular winding.

14. A magnetic thrust compensator for a mechanical thrust bearing including a shaft supporting a bearing disk, the compensator comprising:

a compliant spring mount coupled to the mechanical thrust bearing;

a parallel operating axial magnetic bearing including a stator including at least three parallel stator extensions, at least two rotor disks, each situated on the shaft between two respective ones of the at least three stator extensions, wherein a maximum distance between each rotor disk and each of the two respective ones of the at least three stator extensions is less than a maximum deflection distance of a spring of the compliant spring mount;

first and second electromagnets, each electromagnet situated on a respective one of two adjacent ones of the at least three stator extensions and facing a first one of the at least two rotor disks, and a bias magnet situated on an other of the at least three stator extensions and facing a second one of the at least two rotor disks, the bias magnet capable of receiving a current; and a controller for selectively supplying current to the bias magnet and selectively energizing a first one of the first and second electromagnets to produce a desired force for reducing a load on the mechanical thrust bearing, and for using a current of a second one of the first and second electromagnets to estimate the electromagnetic reluctance of an air gap between the first one of the at least two rotor disks and one of the at least two adjacent ones of the at least three stator extensions.

* * * * *